United States Patent
Beuligman et al.

(10) Patent No.: US 9,200,824 B2
(45) Date of Patent: Dec. 1, 2015

(54) ICE MAKER

(71) Applicant: Whirlpool Corporation, Benton Harbor, MI (US)

(72) Inventors: Brian J. Beuligman, Evansville, IN (US); Scott Daniel Boyd, Cedar Rapids, IA (US); Trevor Hawkins, Belle Plaine, IA (US); Steven L. Proctor, Evansville, IN (US); Chad J. Rotter, Amana, IA (US); William C. Montgomery, Owensboro, KY (US)

(73) Assignee: Whirlpool Corporation, Benton Harbor, MI (US)

( * ) Notice: Subject to any disclaimer, the term of this patent is extended or adjusted under 35 U.S.C. 154(b) by 398 days.

(21) Appl. No.: 13/745,884

(22) Filed: Jan. 21, 2013

(65) Prior Publication Data

US 2014/0202180 A1  Jul. 24, 2014

(51) Int. Cl.
*F25C 1/00* (2006.01)
*F25C 5/02* (2006.01)
*F16K 21/18* (2006.01)
*G05D 9/12* (2006.01)
*F25C 1/22* (2006.01)

(52) U.S. Cl.
CPC .............. *F25C 1/225* (2013.01); *F25C 2600/04* (2013.01)

(58) Field of Classification Search
CPC ... G05D 9/12; F25C 2400/14; F25C 2500/06; F25C 2700/04
USPC ........ 62/66, 74, 320, 347; 137/386, 389, 391, 137/392, 395
See application file for complete search history.

(56) References Cited

U.S. PATENT DOCUMENTS

| | | | |
|---|---|---|---|
| 2001/0054295 A1* | 12/2001 | Kawasumi et al. | 62/347 |
| 2005/0161063 A1* | 7/2005 | Clouser | 134/56 D |
| 2007/0157636 A1* | 7/2007 | Billman et al. | 62/73 |

\* cited by examiner

*Primary Examiner* — John K Fristoe, Jr.
*Assistant Examiner* — Hailey K Do

(57) ABSTRACT

A stand alone ice making appliance or an ice maker within an appliance is provided including a water inlet, a water inlet valve disposed within the water inlet configured to allow water passage when in an open position and configured to prevent water passage when in a closed position, a reservoir in fluid communication with the water inlet, a water level sensor disposed in the reservoir, and a control unit in electrical communication with the water level sensor and the water inlet valve. The control unit is configured to calculate a fluid flow rate using the time between the water inlet valve opening and the water level sensor communicating when a first predetermined water level has been reached within the reservoir, and use the calculated flow rate to calculate a total water inlet valve open time to fill the reservoir to a second predetermined water level.

14 Claims, 18 Drawing Sheets

ICE MAKER

TECHNICAL FIELD

The present disclosure relates to ice makers. More particularly, but not exclusively, an ice maker can be used in a standalone appliance, including under counter or counter top models, or with an appliance that can provide additional consumer functions, such as in a refrigerator or freezer.

BACKGROUND

"Wet" ice makers generally use gravity to feed freshly frozen or cut ice into a container or bin for a user to easily extract the ice for use. Excess or overflow water is a byproduct of the cutting process, which typically pours down across the ice maker storage bin access. The byproduct water may create multiple issues as well as discomfort and product dissatisfaction for the user. Therefore, there is a need in the art of ice making devices to divert the extraneous byproduct water away from the user accessible areas and electronics of the ice maker.

SUMMARY

The present disclosure relates to an ice making apparatus and method of creating a more consistent ice output.

Specifically, the ice making apparatus may include a water supply inlet, a water supply inlet valve configured to allow passage of water from an external water supply into a reservoir when in an open position, and may prevent the passage of water when in a closed position. Additionally, a contact sensor may be disposed within the reservoir. A control unit may be configured in a dry area of a control housing, or alternatively within a protected housing or remote to the appraratus. The control unit may be in electrical communication, either directly or wirelessly, with the water supply inlet valve and the contact sensor . The control unit may at least one of calculate a flow rate of the water supply inlet, calculate a time necessary to keep the water supply inlet valve open, and close the water supply inlet valve after the passage of the calculated time.

In an embodiment, the control unit may include a computer readable storage medium for recording one or both of a water inlet valve open time and a flow rate at the water supply inlet. These recorded data could be utilized by the control unit in the case of a contact sensor failure allowing the ice making apparatus to continue to function and produce ice.

In an embodiment, the contact sensor, as discussed above, is engaged with a reservoir bracket disposed adjacent the reservoir. The reservoir bracket is engaged with the reservoir by at least one locking tab and at least one of a plurality of engagement points configured around a portion of the reservoir. The interaction between the perspective locking tab and the engagement point, ensuring substantially no movement between the reservoir bracket and the reservoir, thereby providing consistent location of the contact sensor within the reservoir throughout the life of the apparatus.

In an embodiment, a recirculation pump, the contact sensor, and the electrical connections for the recirculation pump, the contact sensor, and a drain pump may be configured on the reservoir bracket. The reservoir bracket may include a reservoir bracket cover that is slidably engaged with the reservoir bracket to create a reservoir bracket housing assembly. The reservoir bracket cover is configured to provide a shield that may prevent fluids within the enclosure from unwanted contact of the recirculation pump, the contact sensor, the drain pump or associated electrical connections.

In an embodiment, the recirculation pump may transport water from the reservoir through a distributor, and onto an evaporator plate cooled to a temperature below the freezing point of the desired fluid to be frozen. The evaporator plate may be thermally connected with a cooling unit such as, but not limited to a refrigeration assembly having a compressor, an evaporator, and a condenser interconnected by refrigerant lines. Alternatively other cooling units may be employed, such as, but not limited to a thermo electric type unit and an absorption cooling type system. A cutter grid may be disposed adjacent the evaporator plate and may be configured to receive a section of ice after forming on the evaporator plate. Additionally, a fluid diverter may be disposed adjacent the cutter grid and may be configured to collect a fluid byproduct or meltwater from the cutter grid and divert it toward at least one side of an ice storage element. It is contemplated that the fluid diverter may be fluidly connected to a drainage system through a fluid path configured on the fluid diverter. Additionally, the fluid diverter may be disposed directly on a cutter grid cover. The cutter grid cover may be configured to at least one of engage the control housing and rotatably engage the cutter grid.

In an embodiment, a plurality of dampeners may be configured adjacent the cutter grid to reduce a resulting impact of the ice section as it is received by the cutter grid. Alternatively, the dampeners may be disposed on the cutter grid cover.

In an embodiment, the ice section is configured to be dissected by the cutter grid and deposited into an ice storage element. Additionally, a thermistor may be provided at a predetermined height within the storage element and in electrical communication with the control unit. The thermistor may be configured to measure the temperature at the predetermined height in the ice storage element and send a signal representative of a predetermined temperature to the control housing when the temperature is reached. The control unit may be configured to cease production of ice once the predetermined temperature is reached. Further, the thermistor may be configured to be adjustable within the ice storage area to allow the user to specify a predetermined volume of ice to be stored in the ice storage element at a given time.

In an embodiment, the control housing may include a filter cover disposed on a wet side of the control housing. The filter cover may be configured with a plurality of apertures. The apertures may provide a fluid path to direct extraneous water created between a filter inlet and a water supply outlet. The fluid path may allow the extraneous water to flow down into the ice storage are and away from a filter entrance path configured on the front of the ice making apparatus thereby preventing the extraneous water from egress near the control panel.

In an embodiment, a plurality of water supply lines may be configured to engage a filter housing at an angle substantially perpendicular to the axis of the filter housing. The water supply lines may include a filter housing connector configured to engage the filter cover collars. The angle of insertion into the filter housing and the collars on the filter cover may be configured to prevent the water supply lines from disconnecting from the filter housing.

In an embodiment, a filter cartridge may be provided within the control housing and accessible to a user from the front of the appliance. The filter cartridge may be slidably and rotatably engaged with a filter housing. The filter housing may be disposed within a filter housing shuttle, which may be slidably disposed within the control housing. Additionally, one or more springs may be configured to engage with the rear face of the filter housing shuttle and a rear face of the control housing. The springs may be configured to bias the filter housing shuttle forward. A push push type latch may be provided to engage with the filter housing shuttle and the control housing, which may allow the filter cartridge to extend a predetermined length out of the control housing thereby providing greater access to the user to apply the torque necessary to extract the filter cartridge from the control housing.

DETAILED DESCRIPTION OF THE PREFERRED EMBODIMENTS

Figure 1:
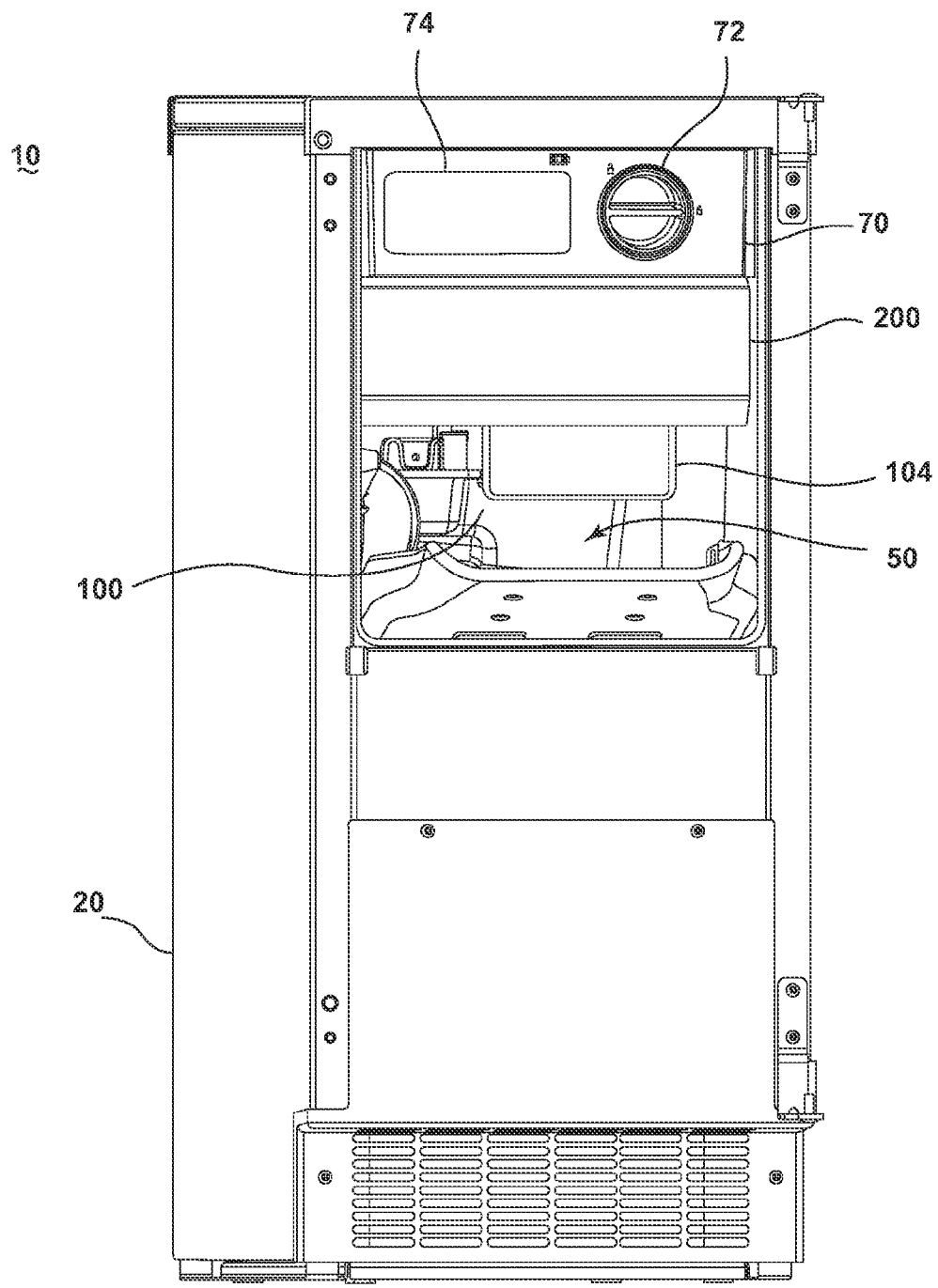
FIG. 1 illustrates a front view of an ice making appliance with a door removed.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

According to various exemplary illustrations described herein, a system and method are disclosed. Specifically, an exemplary ice maker, which may be in the form of a standalone appliance, including undercounter, freestanding or counter top, or incorporated into another appliance, such as a refrigerator or freezer appliance. Although the embodiment described below is illustrated as a standalone appliance, the invention should not be limited to such an arrangement.

Turning to the exemplary illustrations, FIG. 1 illustrates a front view of an ice maker 10 with an exterior enclosure door removed. The ice maker, as illustrated, includes an exterior cabinet 20 for housing various ice making assembly components for producing and storing an ice product (not illustrated). The ice product may be in the form of a single slab, plurality of slabs or a plurality of formed ice elements configured for separation. The ice making assembly components will be discussed in greater detail below and may include, but are not limited to, a compressor, an evaporator, a condenser interconnected by refrigerant lines. One will appreciate that other cooling solutions, including thermoelectric and absorption, can alternatively be used. The refrigerant may be in communication with a cooling surface for freezing an ice making fluid, such as water or other fluid; water will be discussed below as the ice making fluid used. The ice maker may include an ice storage area 50 for storing a finished ice product that a user may retrieve after final processing of the ice by the ice maker assembly. A control housing 70 may house a filter cartridge 72 and a user interface 74. The user interface 74 may be communicatively connected to a control unit 76 (See FIG. 2) to allow selective control of various aspects of ice maker 10 operations. The ice maker 10 may also include a reservoir 100, a reservoir bracket cover 104, and a cutter grid cover 200.

Figure 2:
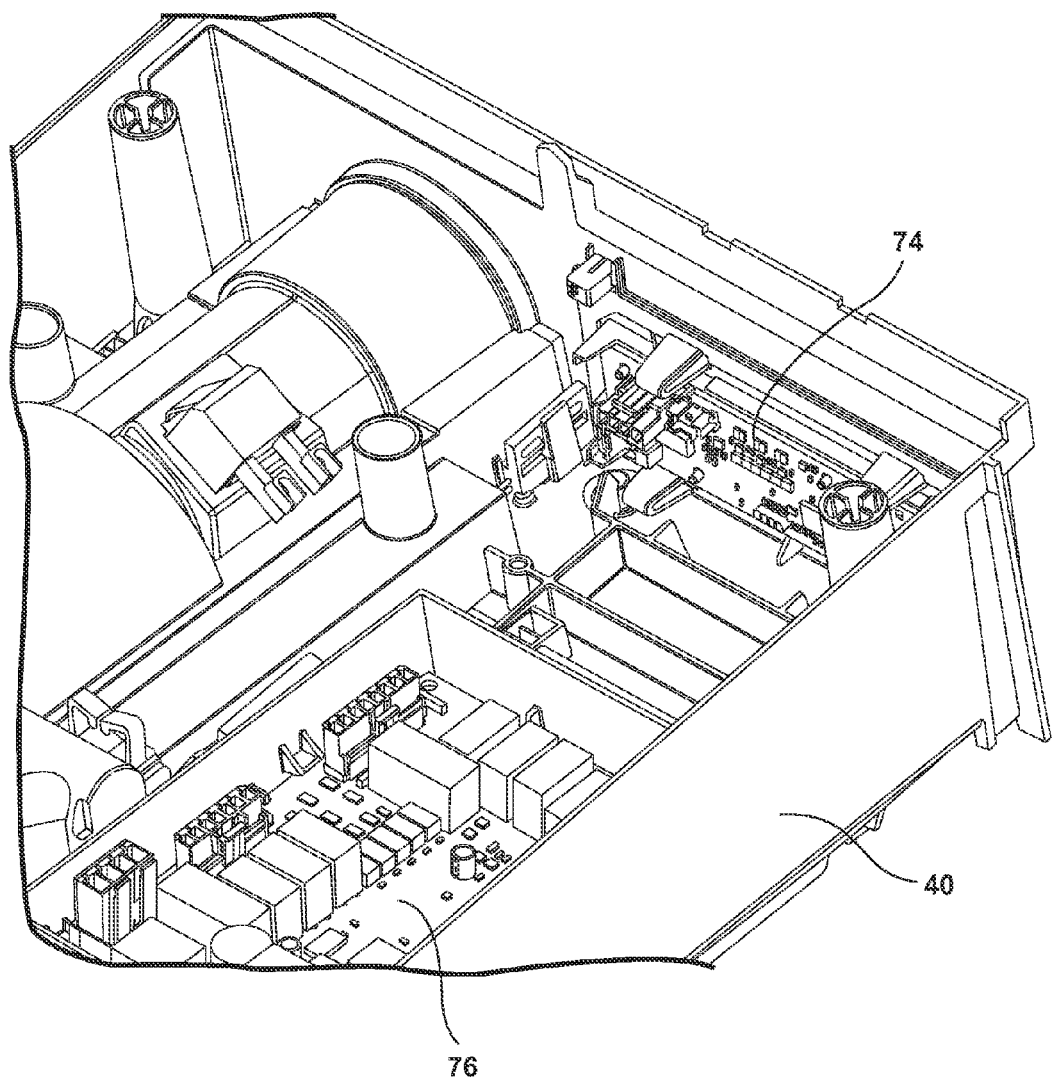
FIG. 2 illustrates an angled perspective view of a control housing with the electronics attached thereto.
Figure 3:
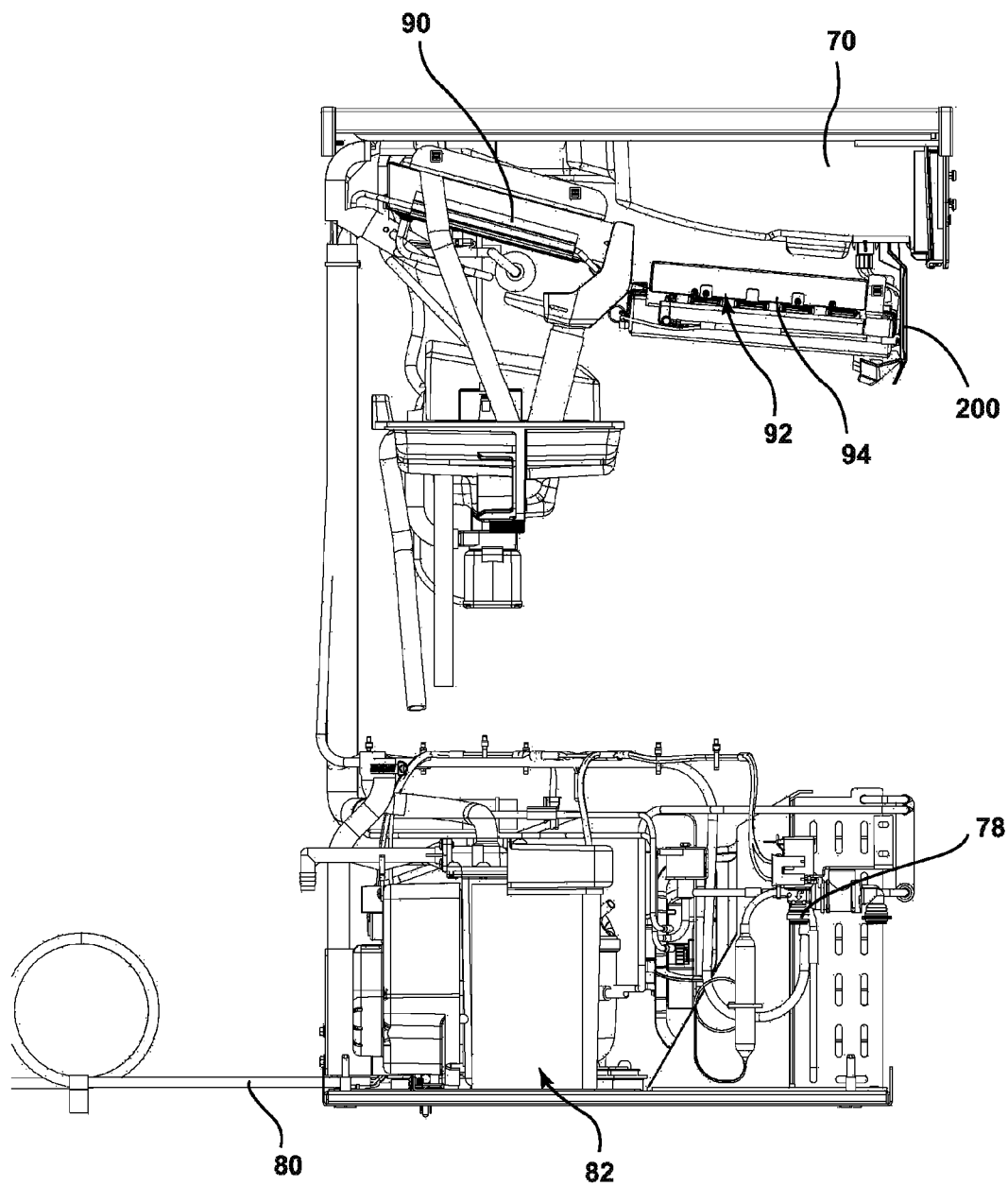
FIG. 3 illustrates a side view of the ice production system.
Figure 4:
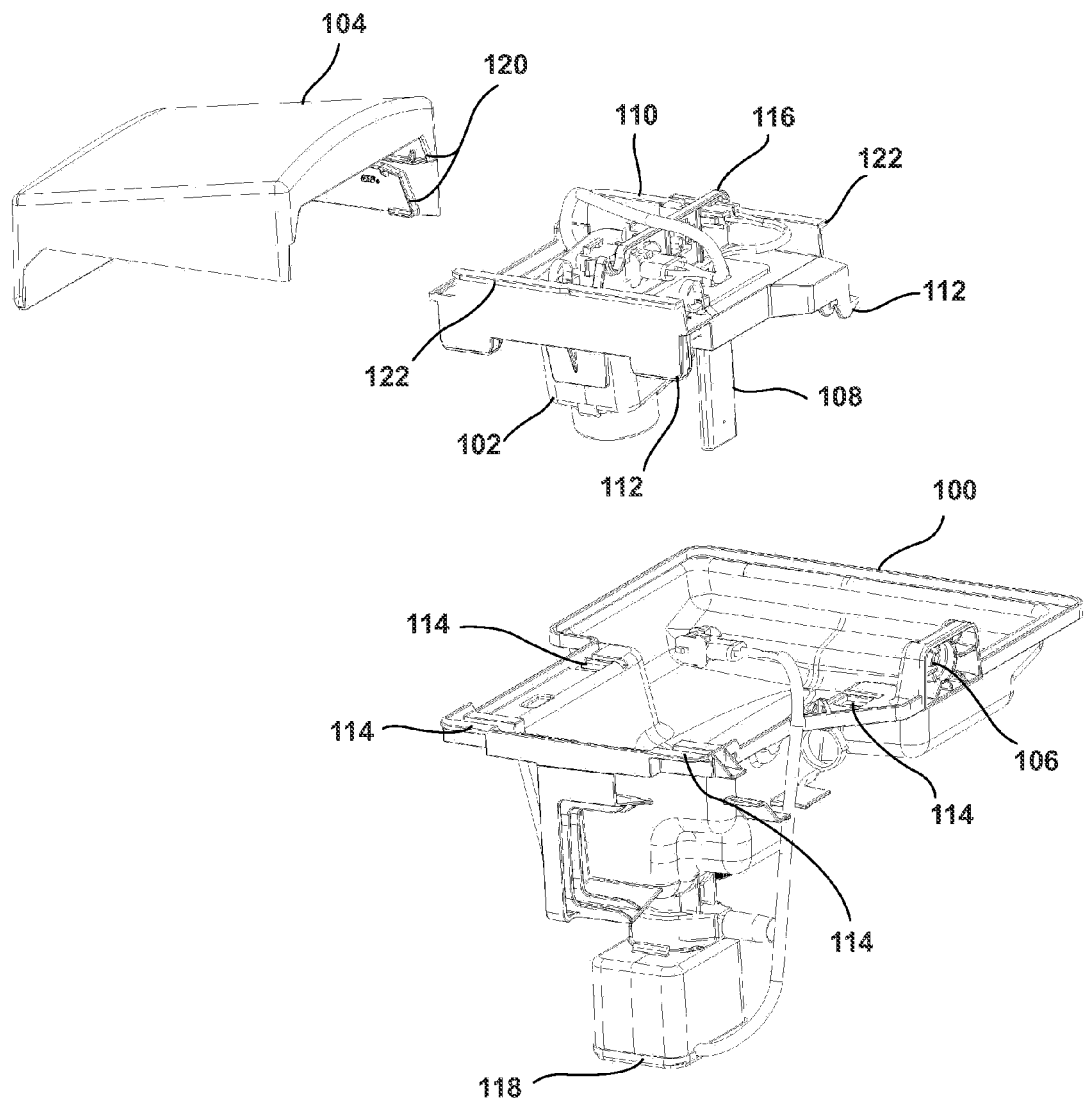
FIG. 4 illustrates an exploded angled perspective view of a reservoir assembly.
Figure 11:
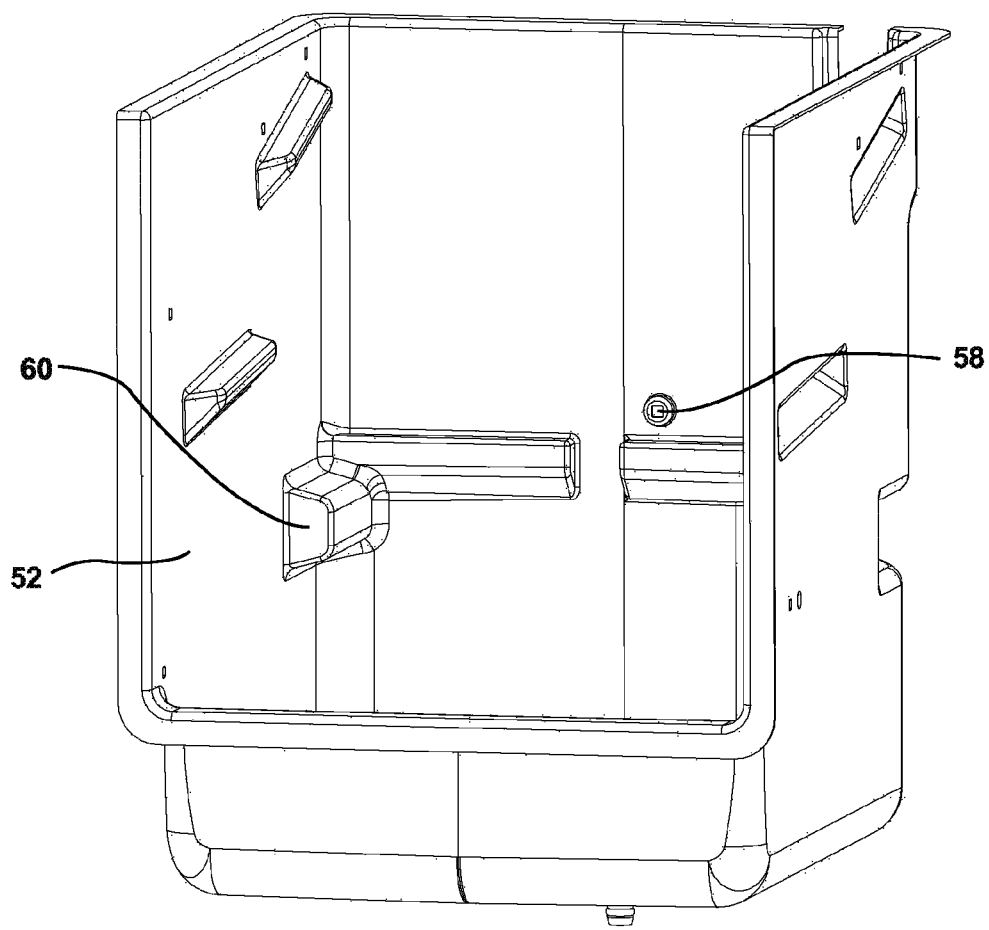
FIG. 11 illustrates an angled perspective view of an ice storage area.

Referring now to FIGS. 2, 3, and 4, which illustrate various aspects of the disclosure where the control unit 76 may be configured to open a water inlet valve 78 associated with an external water supply inlet at a time when the production of ice is desired. Opening the water inlet valve 78 may allow passage of a water supply (not shown) from an external water source fluidly connected through the water supply inlet and into a reservoir 100. The water may be staged in the reservoir 100 prior to being pumped through a distributor 96 and onto an evaporator cooling plate 90 by a recirculation pump 102 that may be disposed within the reservoir 100. The reservoir 100 may be attached to the ice storage area 50 by a fastener (not shown). The fastener may be configured to extend through an aperture configured in a reservoir mount 106 configured in the reservoir 100 and into to a receiving portion 58 (FIG. 11) configured at least one of on and through an ice storage element 52 configured within the ice storage area 50. The reservoir 100 is supported by at least one reservoir interface 60 configured on the ice storage element 52 (FIG. 11). The evaporator cooling plate 90 may be cooled to a temperature below the freezing point of water by a refrigeration unit 82, which is well known in the art and will not be discussed in detail here.

A contact sensor 108 may be configured within the reservoir 100 and may sense when water within the reservoir 100 reaches a desired height. It is contemplated that the contact sensor 108 may be configured adjacent the reservoir 100 in a variety of locations that may sense or indicate the desired height of the water within the reservoir. The contact sensor 108 may be configured to relay a signal to the control unit 76 located in a cavity of the control housing 70 that isolated from the water. The control unit 76 may then determine the time lapse between opening of the water inlet valve 78 and the signal from the contact sensor 108 representing the desired height of the water within the reservoir 100. This time lapse may be used to calculate a water flow rate of the water flowing through the water supply inlet, using the following formula:

$$F = Vsn/Tsn$$

Where:
F=Flow Rate
Vsn=Volume of water in reservoir at the sensor
Tsn=Time to reach the sensor within the reservoir.

The control unit 76 may then use the calculated flow rate to calculate an open water inlet valve 78 time to achieve a predetermined volume of water in the reservoir 100, using the following formula:

$$T = F*Vd$$

Where:
T=total time to keep the valve open
F=flow Rate
Vd=total volume of water in reservoir desired.

The water flow rate may be calculated on every fill cycle, adjusting for minor or major changes in a water supply pressure. This may be related to both external water pressure, or internal obstructions, including that a water filter.

It is further contemplated that the contact sensor 108 may be positioned such that it senses a desired volume of water within the reservoir 100 representative of an upper of full condition. In this condition, Tsn and T may be substantially the same, and Vsn and Vd may be substantially the same.

Figure 5:
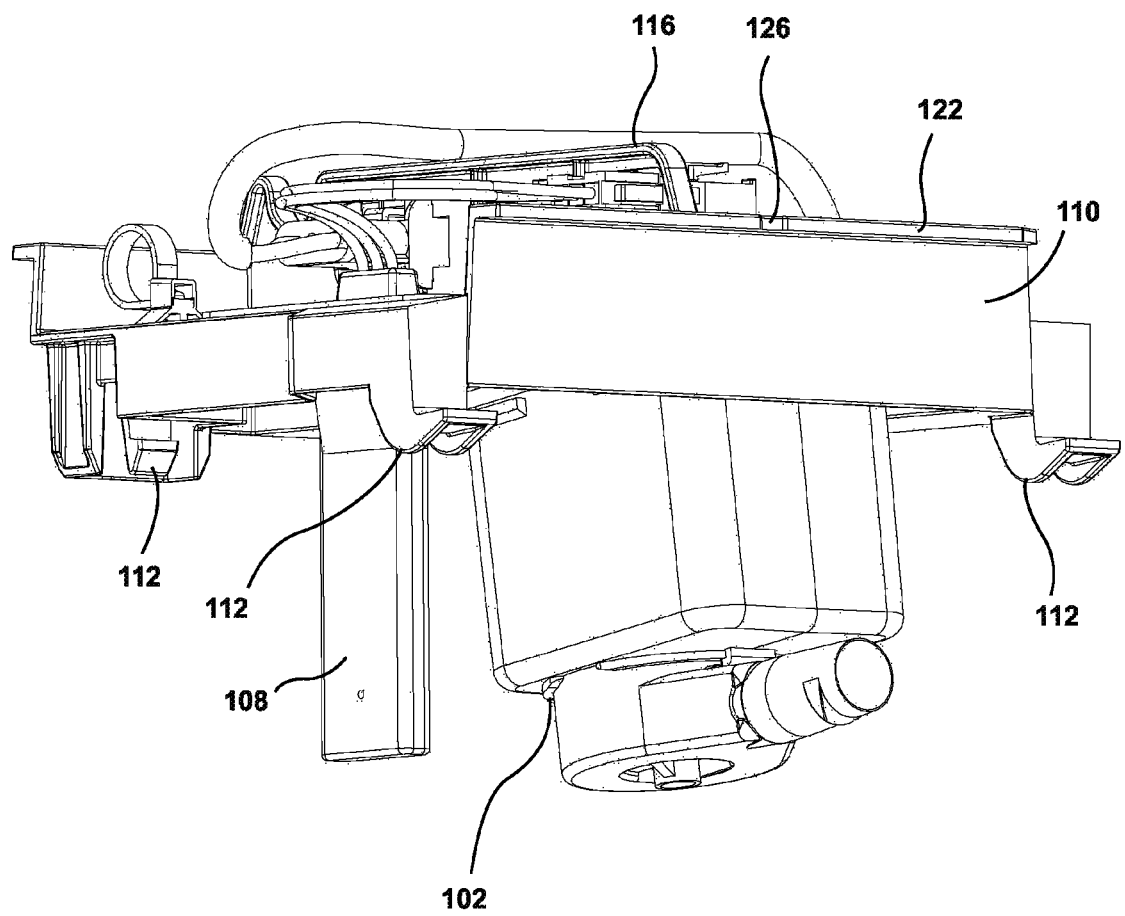
FIG. 5 illustrates an angled perspective view of a reservoir bracket with a recirculation pump attached thereto.

Alternatively, the contact sensor 108 may be attached to a reservoir bracket 110 as shown in FIG. 5. The reservoir bracket 110 may have locking elements 112 that allow the reservoir bracket 110 and reservoir 100 to be snap fitted together through an interaction between the reservoir bracket and a corresponding receiving aperture 114 configured on the reservoir 100. The snap fit connection may be at one or a plurality of predetermined mating points configured on a perimeter around the reservoir bracket 110 and the reservoir thereby preventing independent movement of the reservoir 100 and the reservoir bracket 110 as they are coupled together. Additionally, the reservoir bracket 110 may allow for the contact sensor 108 to be disposed within the reservoir 100 directly, thereby improving accuracy of measurement by removing configuration variation between the reservoir 100 and the reservoir bracket 110. The reservoir bracket 110 may also include a panel mount surface 116 for positive attachment of the electrical connectors for the recirculation pump 102, the contact sensor 108, and the reservoir drain pump 118, thereby removing any variation at the connections.

In a further aspect of the disclosure, the time information gathered by the contact sensor 108 or the flow rate information calculated by the control unit 76 may be stored in a computer readable memory configured within the control unit 76. This stored information may be further utilized by the control unit 76 to control subsequent reservoir 100 fill cycles in the case of a contact sensor 108 failure or other situation where the instant time to fill information is not available. Additionally the control unit 76 may use one or more of the recorded data to do, or assisting in doing, one or more of the following: predict harvest cycle times, time to complete the next harvest, time to fill the entire storage bucket, time before filters need to be replaced, time until the next cleaning cycle should be implemented, recalibration of the flow meter and the like.

Figure 6:
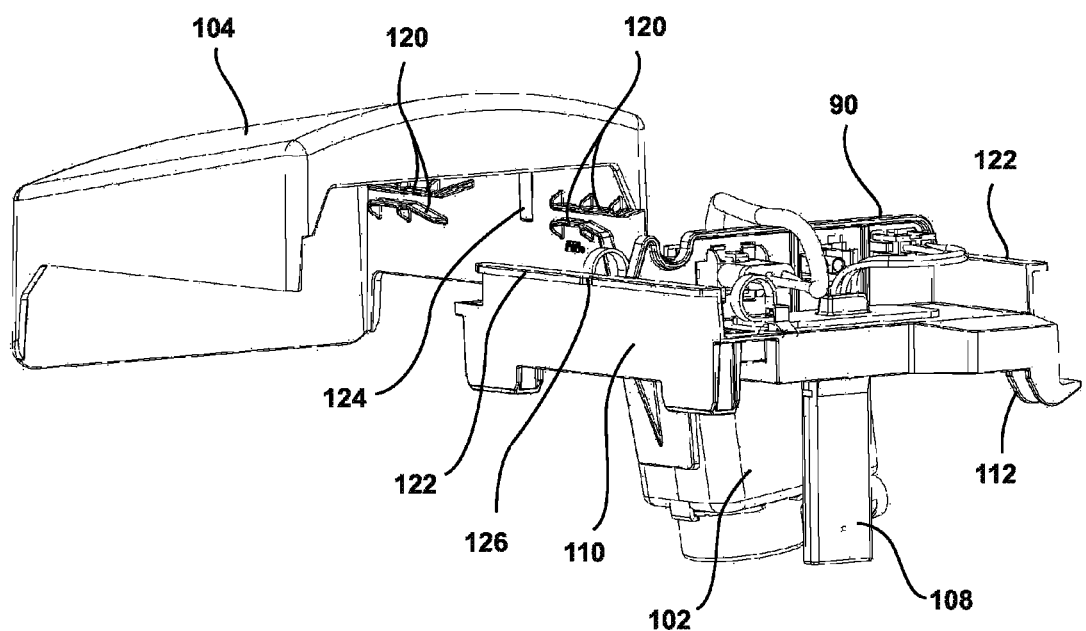
FIG. 6 illustrates an exploded angled perspective view of a reservoir bracket and a reservoir bracket cover.

A further aspect of the disclosure, as shown on FIG. 6, is a reservoir bracket cover 104 that may be slidably engaged to the reservoir bracket 110. The reservoir bracket cover 104 may have a plurality of slidable engagement elements 120 configured on the inner wall. The slidable engagement elements 120 may be configured to engage corresponding cover mounting flanges 122 on the reservoir bracket 110. The reservoir bracket cover 104 may include a substantially semi-hemispherical locking element 124 on the inner wall, configured to engage a corresponding notch 126 in the reservoir bracket cover mounting flange 122. The locking elements 124 and corresponding notch 126 may provide a positive stop to locate the reservoir bracket cover 104 to the mounting flange 122 to prevent damage when attaching the reservoir bracket cover 104. The reservoir bracket cover 104 may provide a protective cover over the recirculation pump 102, the contact sensor 108, and their associated electrical connectors for the recirculation pump 102, contact sensor 108, and a reservoir drain pump 118 disposed below the reservoir 100.

Figure 7:
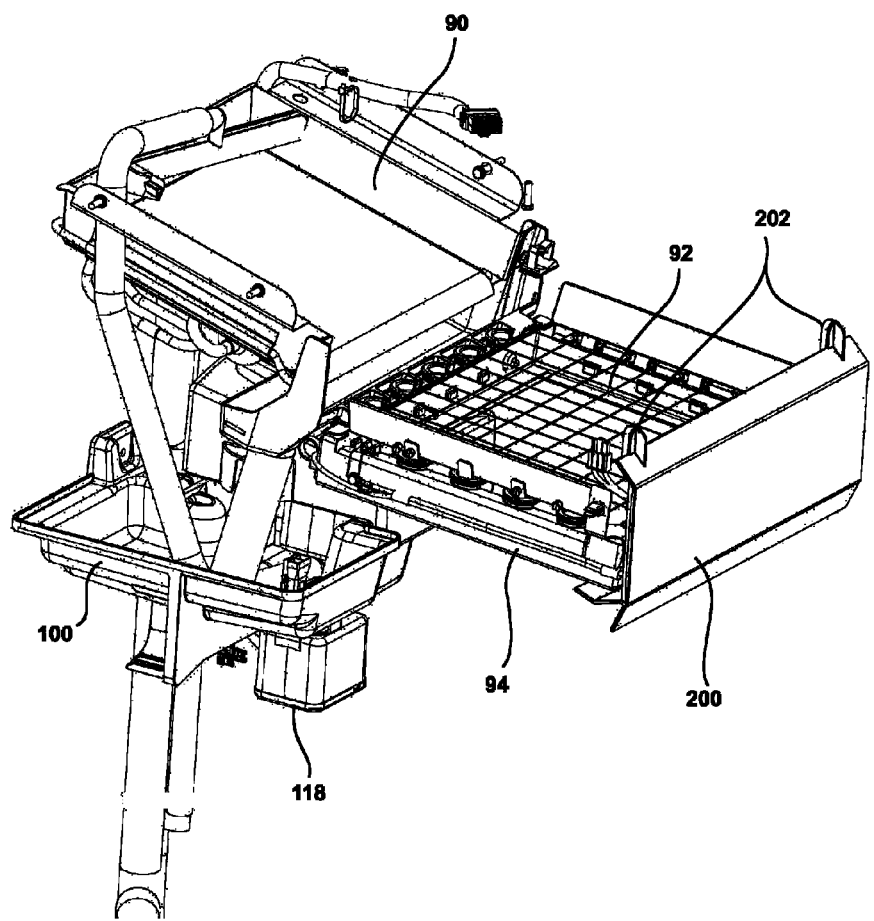
FIG. 7 illustrates an angled perspective view of a reservoir, evaporator plate, cutter grid and cutter grid cover.

According to yet another aspect of the disclosure, the evaporator plate 90 may be sloped downward toward the front of the ice maker 10. The evaporator cooling plate 90 may be heated after the formation of an ice section on the surface of the evaporator cooling plate 90 to allow for separation between the two. The temperature difference between the frozen ice section and the heated plate may produce a thin layer of water on the bottom of the ice section. The ice section may then slide off the evaporator cooling plate and down onto a cutter grid 92, where the ice section is dissected into cubes for use by consumers. The cutter grid 92 may be supported on four sides by a cutter grid frame 94. The cutter grid 92 may be engaged with an aesthetically pleasing cutter grid cover 200, shown in FIG. 7. The cutter grid cover 200 may be configured to engage the control housing 70 and the cutter grid frame 94. It is contemplated that the engagement of the cutter grid cover 200 to the control housing 70 and the cutter grid frame 94 may be through the use of at least one fastening element, such as but not limited to cutter grid frame engagement elements 204. The engagement may take various known forms, such as, but not limited to threaded fasteners, push pin type pressure fit fasteners or other known elements, which are further illustrated as control housing engagement elements 202.

Figure 8:
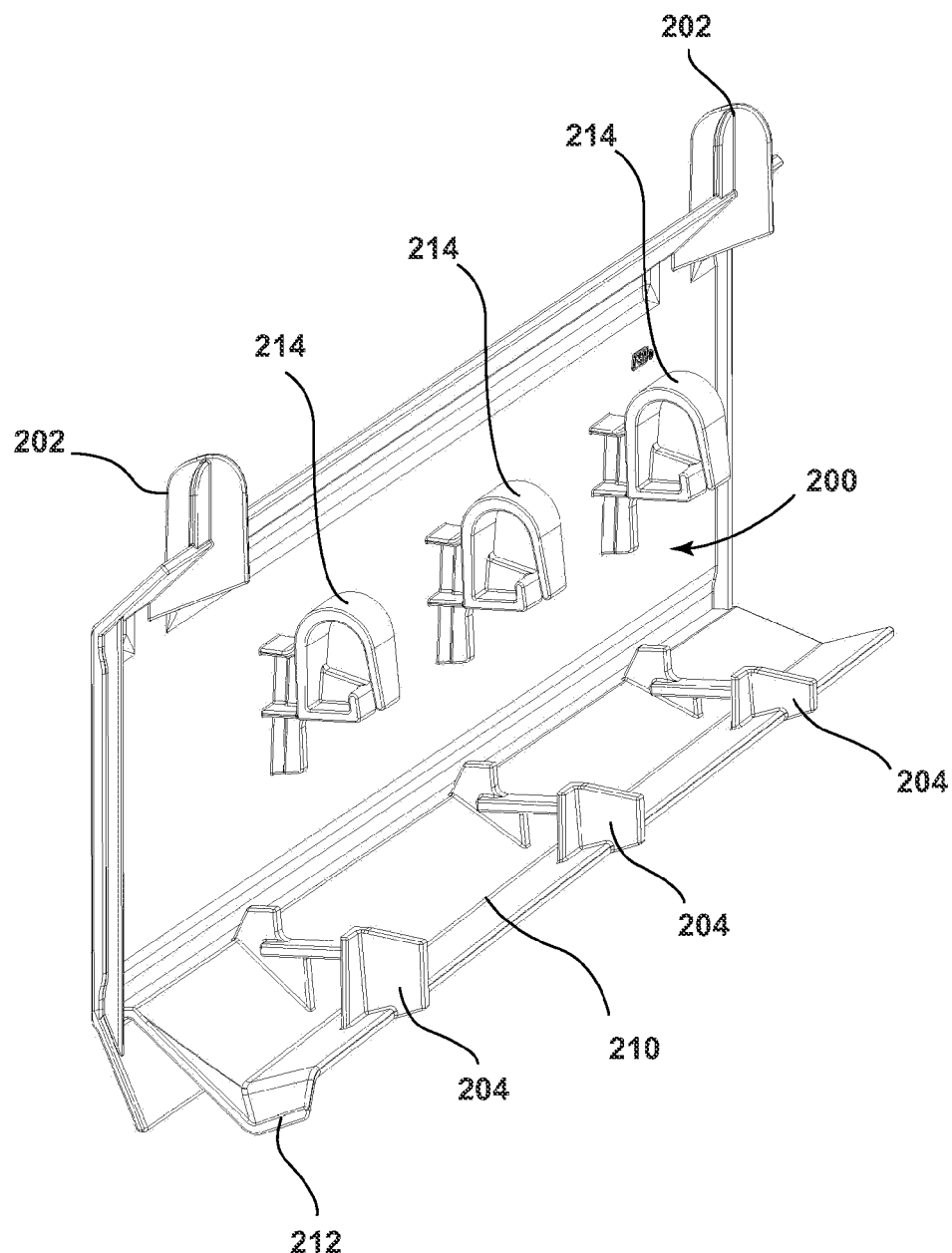
FIG. 8 illustrates an angled perspective view of a cutter grid cover.

Another aspect of the disclosure is shown in FIG. 8 illustrating the cutter grid cover 200 including a fluid diverter 210 that extends substantially under the front of the cutter grid frame 94, which is an area where a large amount of the meltwater congregates. This congregation of meltwater is a result of the slope created to allow the ice to slide out onto the cutter grid 92 and the cutter grid frame 94. As illustrated, the fluid diverter 210 is configured to divert a substantial portion of the meltwater to one or both sides of the ice storage area 50, away from an area of user access. The fluid diverter 210 may have a relatively low slope profile over the majority of the fluid diverter 210 surface, and may transition to a relatively high slope profile at the one or more fluid diverter ends 212. The high slope profile may be configured to sever the flow path by disrupting the surface tension of the meltwater drips, such that the drips cannot overcome the force of gravity thereby preventing a fluid path on an underside of the fluid diverter 210 and back toward the center of user access. In another embodiment, the fluid diverter 210 may also include a converging point to further overcome the effects of surface tension. The converging point may be configured on at least one fluid diverter end 212 or any other position along the fluid diverter 210 where an egress fluid path is located. It has been considered that other egress fluid path conduits may be employed to direct the meltwater such as a tube, trough, or line configured to direct the water to a desirable location away from the user access.

Figure 9:
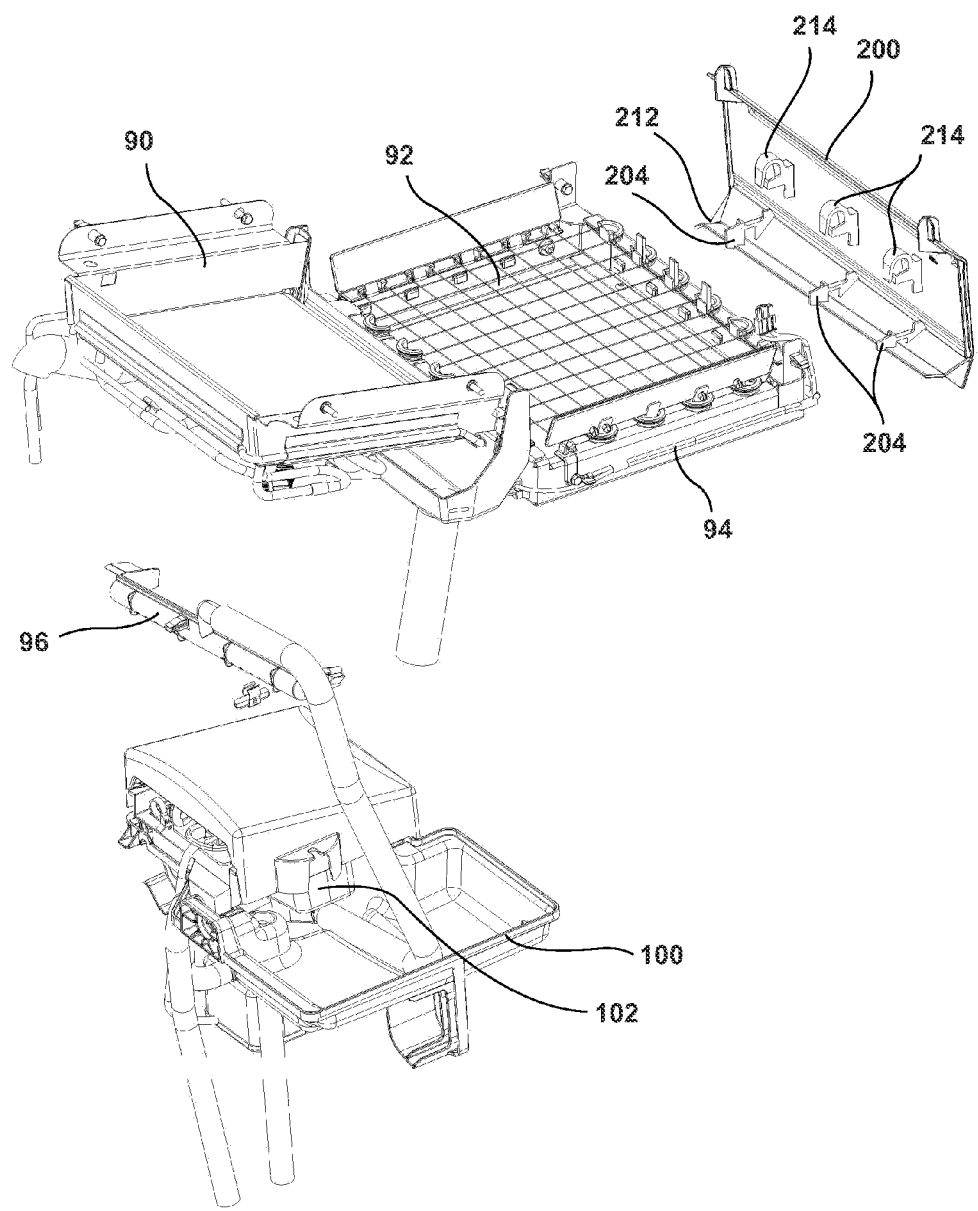
FIG. 9 illustrates an exploded angled perspective view of a reservoir assembly, an evaporator plate, a cutter grid, and a cutter grid cover.

FIG. 9 shows an exploded view of the components in another aspect of the disclosure. The cutter grid cover 200 may also have one or more dampeners 214 configured to provide a soft stop for the ice section at the end of its travel over the cutter grid 92. The dampeners 214 may provide a cushion at the end of a motion created when the ice travels from the evaporator cooling plate 90 to the cutter grid, thereby locating the ice in a predetermined position over the cutter grid 92. The dampeners 214 aid in the prevention of prematurely cracking the ice section prior to the dissecting process, thereby providing a more uniform and consistent ice form to the user. Moreover, the dampeners 214 may provide a contact surface that reduces a noise created from an ice impact at the end of its travel. It has also been contemplated that these dampeners 214 may be positioned or configured within the ice maker 10 such that the dampeners 214 are adjacent to the cutter grid frame 94 and not directly attached to any specific structure.

Figure 10:
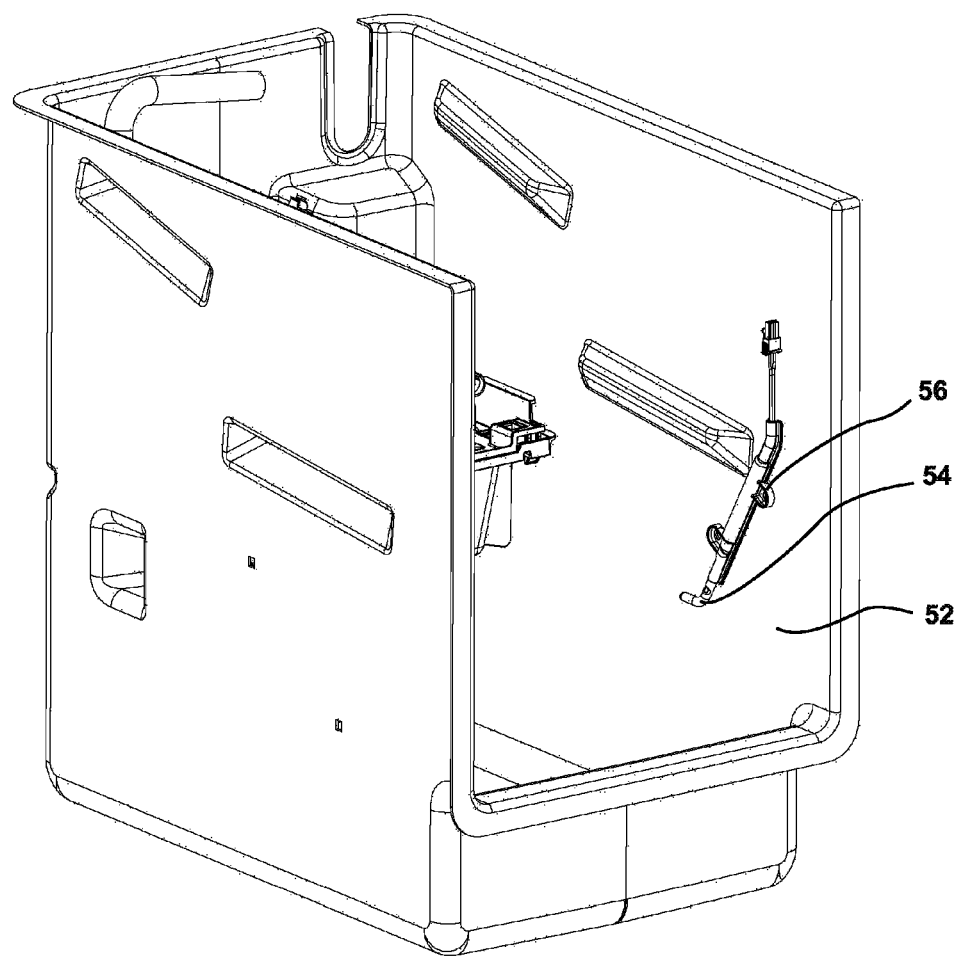
FIG. 10 illustrates an angled perspective view of an ice storage area.

Turning to FIG. 10, an isometric view of the ice storage area 50 within the cabinet 20 of the ice making appliance 10 is illustrated. Additionally, FIG. 11 provides a further isometric view of the ice storage area 50 at a different angle. The ice storage area 50 provides a finished ice holding area after the ice slab is dissected by the cutter grid. The finished ice falls under the force of gravity into an ice storage element 52. As ice is produced within the ice making appliance 10, the level of ice within the ice storage area 50 increases. Thus, the ice storage element 52 may have a selectively adjustable level sensor, which is illustrated as a thermistor 54. However, other adjustable or nonadjustable level sensors may be used, such as, but not limited to a mechanical lever, electronic eye or other type of level sensing device.

As illustrated, the thermistor 54 is in electrical communication with the control unit 76 to provide the control unit 76 with a signal representative of a desired level of ice, which allows the control unit 76 to start or stop the ice producing cycle. Thus, as the level of ice within the ice storage area 50 is raised, the sensed temperature of the thermistor 54 at its predetermined height decreases. Once the sensed temperature by the thermistor 54 reaches a predetermined temperature, the thermistor 54 sends a signal to the control unit 76, which is in electrical communication with the water inlet valve 78, the evaporator plate 90, and the refrigeration unit 82, to stop or start the production of ice. The thermistor 54 may be a push/pull type thermistor, adjustable in at least a low, medium or high position. If the user needs more ice for a given situation, the thermistor 54 may be selectively adjusted into a higher position within the ice storage element 52 without the use of tools. The thermistor 54 may be configured to fit into a sleeve 56 that has apertures or indentations where protrusions extending from the thermistor engage and snap into, thereby providing the user with at least a predetermined low, medium, and high settings. Additionally, the thermistor 54 may be configured with a channel type or other slidable engagement connection to allow the thermistor to slide freely within the sleeve 56. It is contemplated that a variety of slidable or adjustable type connection may be utilized that provide the themistor 54 with series of predetermined stopping points allowing an infinite number of level choices between an area approximately at the low and an area approximately at the high position. It has also been contemplated that this type of adjustable level sensing may be also used in an ice maker portion configured within a conventional refrigerator.

Figure 12:
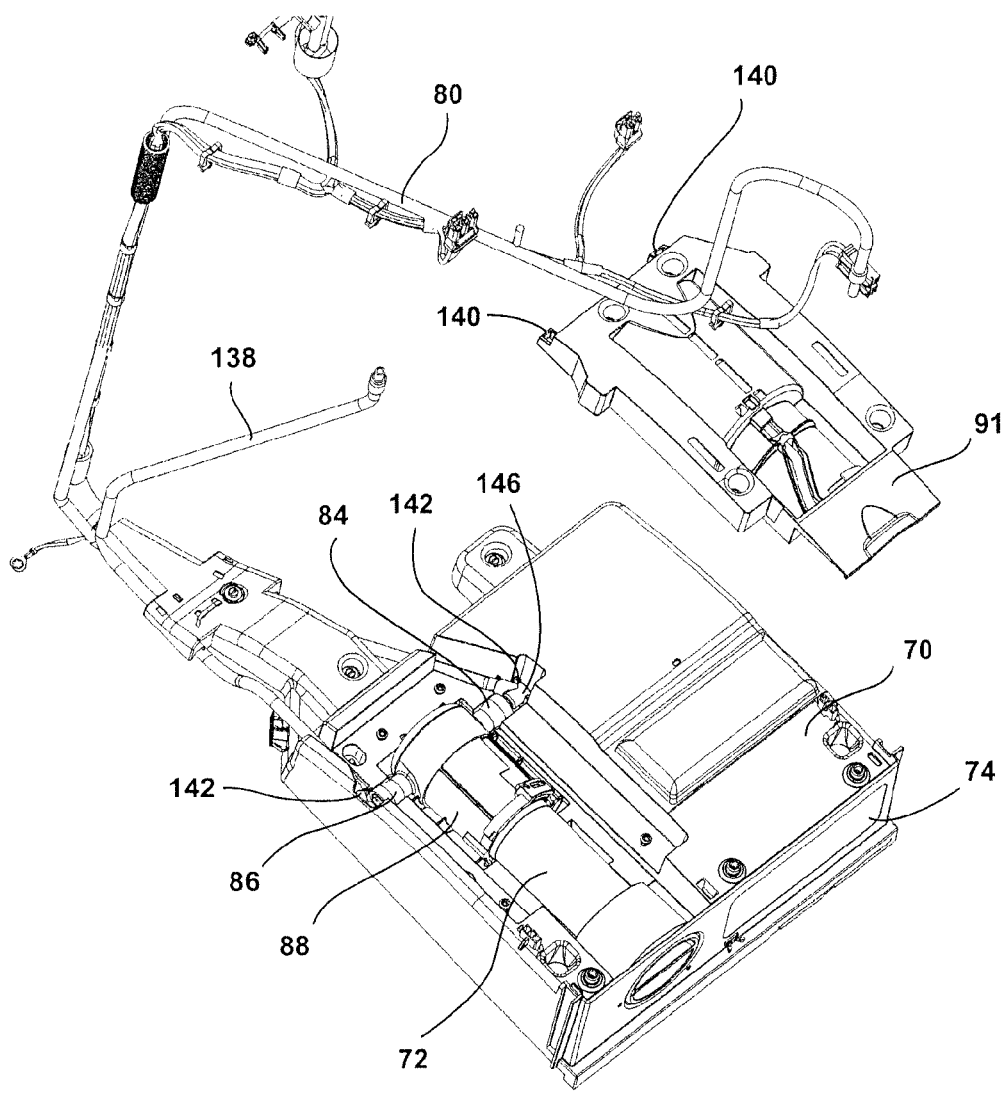
FIG. 12 illustrates an exploded angled perspective view of a control housing assembly and a filter cover.

FIG. 12 is an exploded view of the bottom side of the control housing 70 including the filter housing 88 and the filter cover 91. In another aspect of the disclosure, the ice making appliance 10 may include a filtration system comprised of a water supply inlet, a filter outlet water line 138, water line overmolds 146 (shown in detail in FIG. 13) disposed on the water supply inlet and the filter outlet water line 138, filter housing 88 with inlet connection fitting 84 and outlet connection fitting 86, and a filtration element 72. As illustrated, the filter housing 88 is slidably engaged with the control housing 70. The control housing 70 may be configured to receive the filtration element 72 via the filter housing 88 as shown in U.S. Patent Application No. 13/233,390, entitled "FILTER UNIT," filed on Sep. 15, 2011, the entire disclosure of which is hereby incorporated herein by reference.

The filtration housing 88 may have an inlet connection fitting 84 configured to receive the water line overmold 146 associated with the water supply inlet and the filter outlet water line 138. The water supply inlet and filter outlet water line 138 are illustrated in a configuration direction substantially perpendicular to the axis of the filter housing 88. A filtration element 72 may be at least one of slidably and rotatably engaged with the filter housing 88. As illustrated the filtration element 72 is inserted into the control housing 70 and rotated into home position within the filter housing 88, thereby providing fluid communication between the water supply inlet and the filter outlet water line 138. However, the fluid path may be configured such that when the filtration element 72 is not engaged properly or present within the control housing 70, the filtration element 72 may be bypassed and the inlet connection fitting 84 and outlet connection fitting 86 may be in direct fluid communication.

As illustrated, the overmolds 146 are configured to attach to the inlet connection fitting 84 and outlet connection fitting 86 at an angle substantially perpendicular to the axis of the filter housing 88. The control housing 70 may include collars 142 configured to contact the water line connectors to prevent any movement of the connectors relative to the filter housing 88. The collars 142 may prevent damage or disconnection of the water line connectors to the filter housing 88. The control housing 70 may include a filter cover 91 configured with water line guides 140, the water line guides 140 may be configured to have a radius substantially the same as the outer diameter of the water supply inlet and filter outlet water line 138, preventing kinking of the water lines from a force acting substantially perpendicular to the axis of the water lines.

Figure 13:
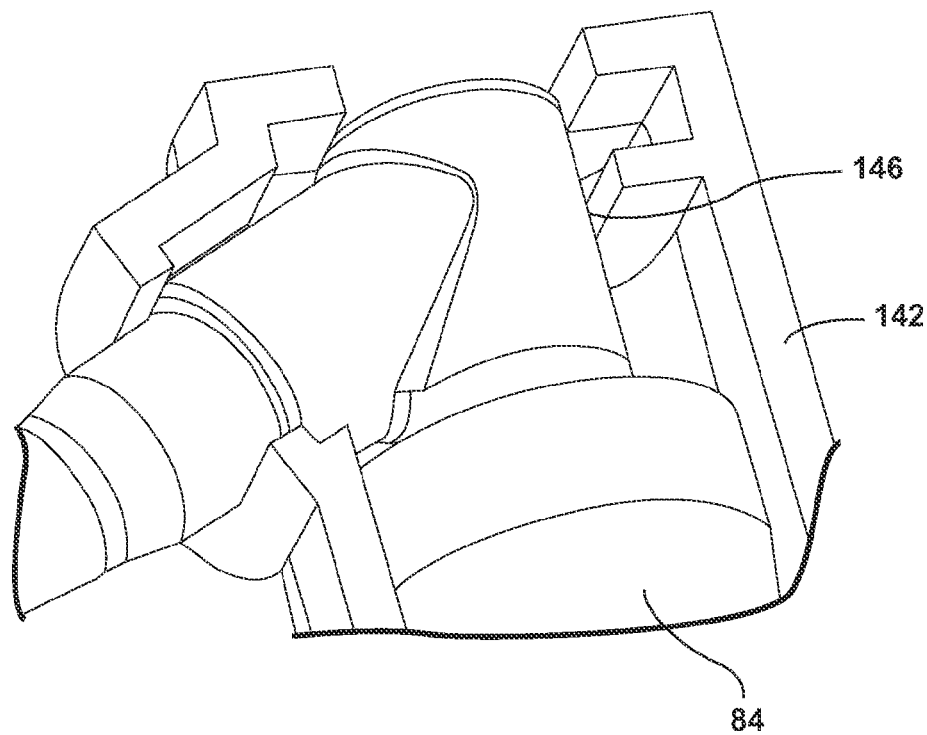
FIG. 13 illustrates an angled perspective view of a water line overmold.
Figure 14:
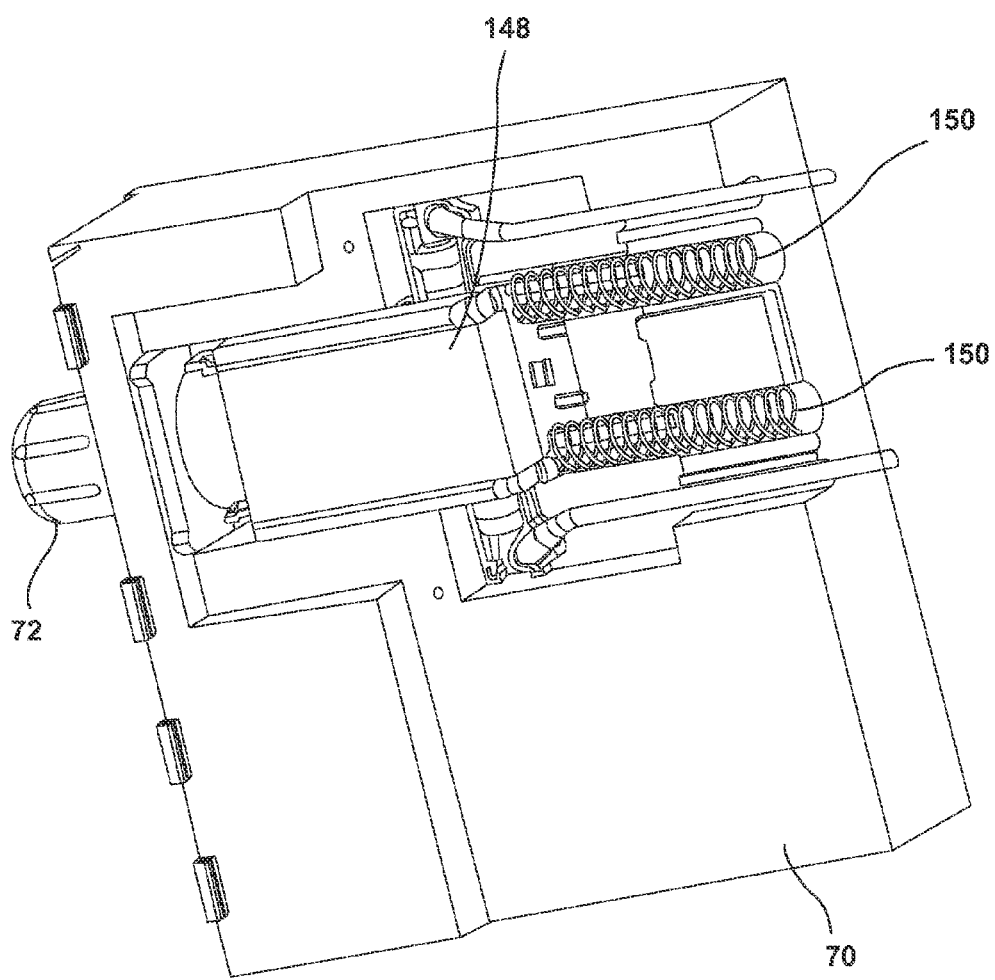
FIG. 14 illustrates an angled perspective view of the underside of a control housing.
Figure 15:
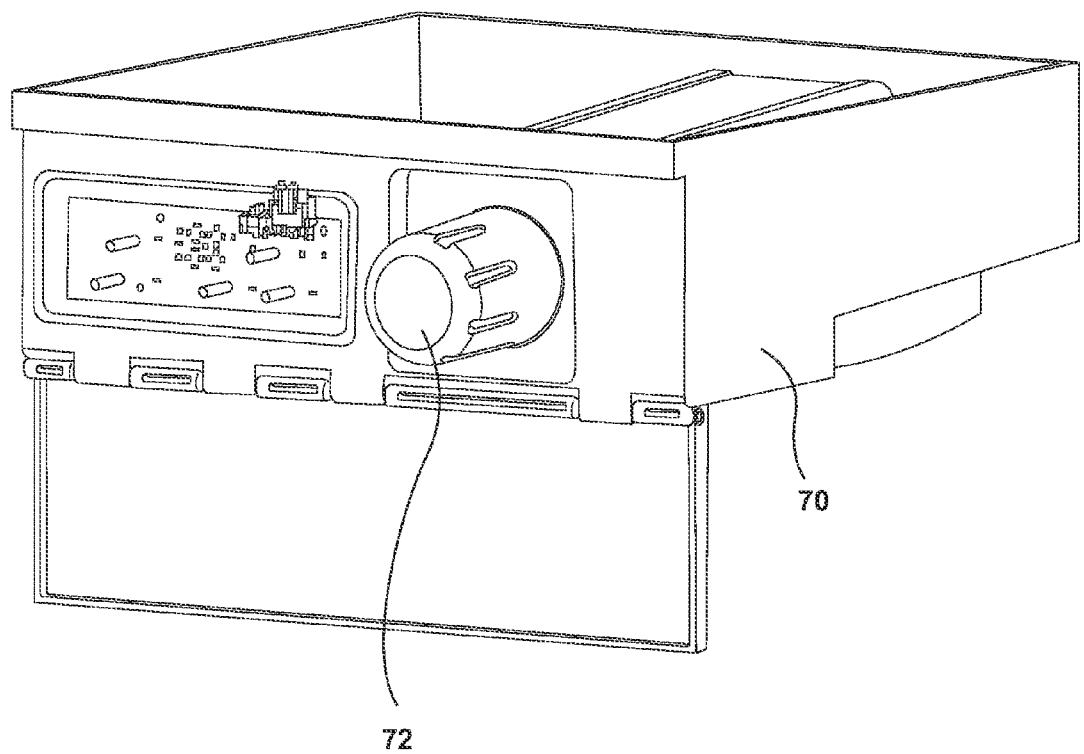
FIG. 15 illustrates a perspective view of a control housing with a filter in an extraction position.
Figure 16:
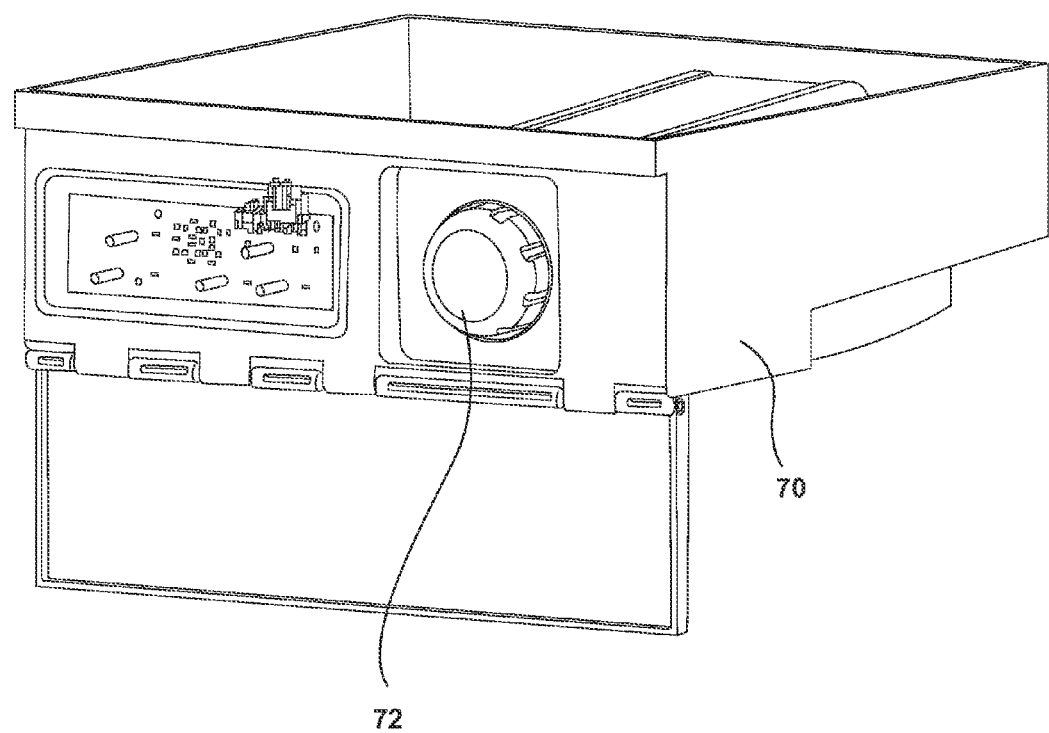
FIG. 16 illustrates a perspective view of a control housing with a filter in a retracted position.
Figure 17:
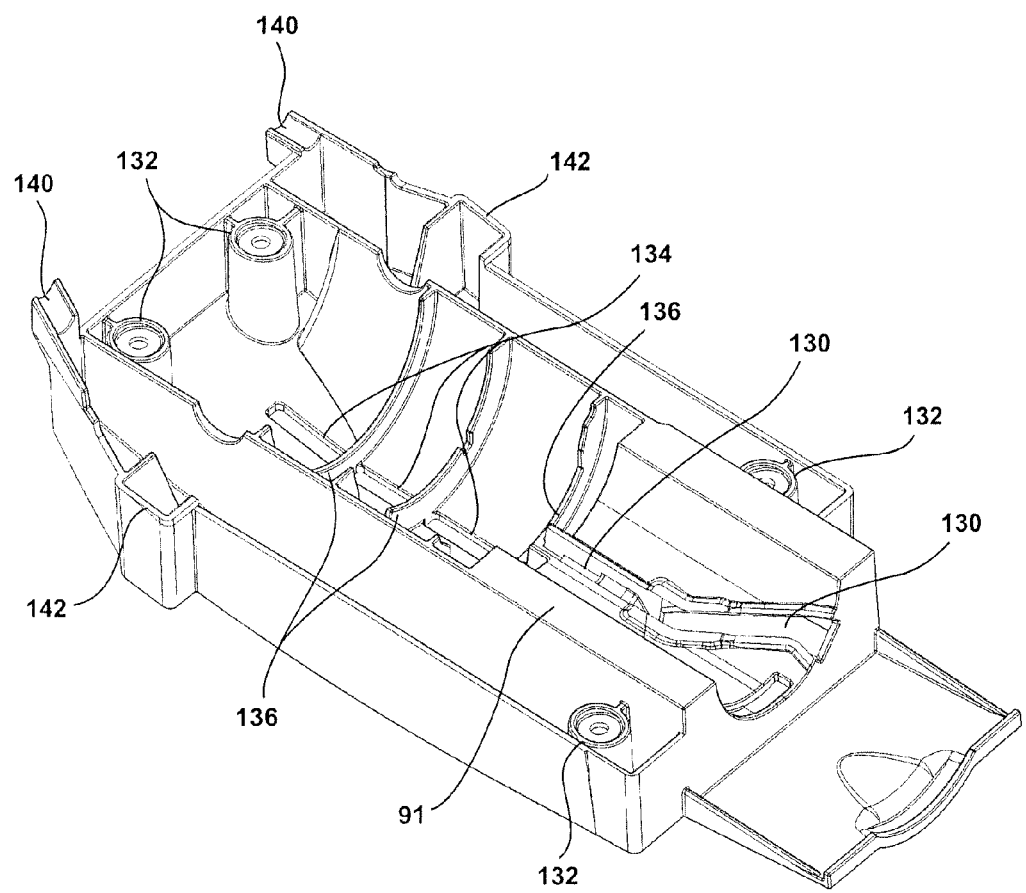
FIG. 17 illustrates an angled perspective view of a filter cover.
Figure 18:
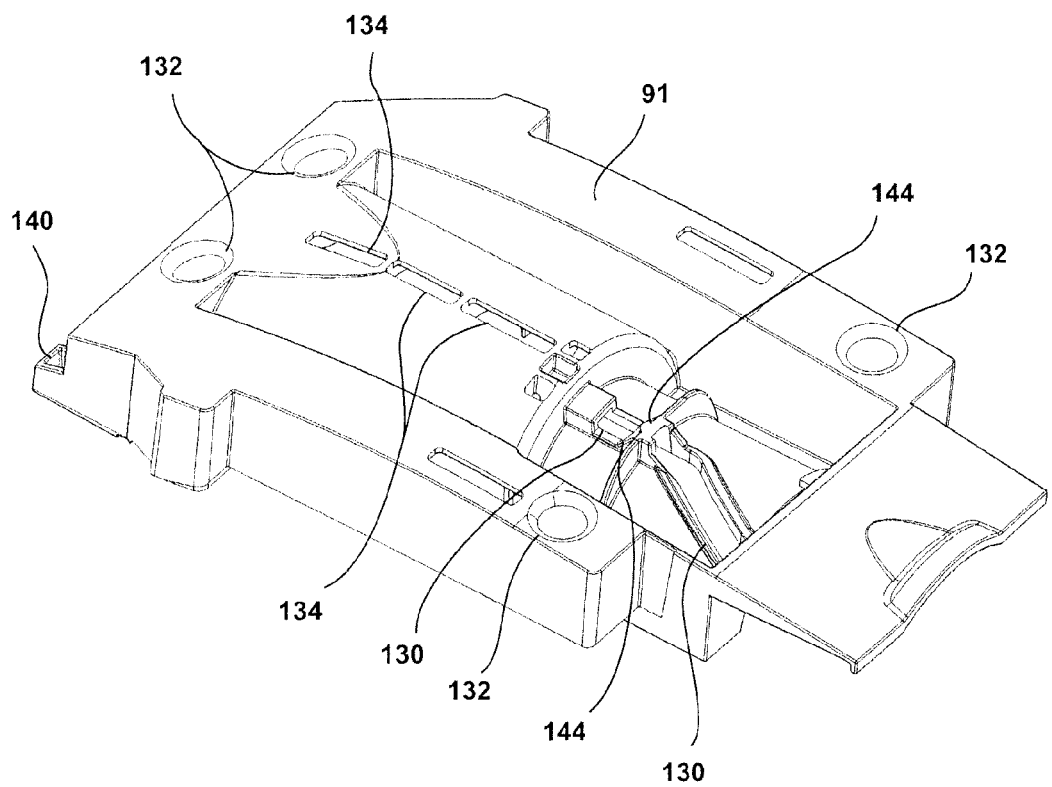
FIG. 18 illustrates an angled perspective view of the underside of a filter cover.

FIG. 14 shows an isometric view of another aspect of the disclosure, whereby filtration element 72 may be positioned by a springing mechanism for introduction or extraction to the ice maker 10. The springing mechanism may be a push push mechanism, which allows an extended or a retracted position based on a spring and lock interaction. Specifically, the control housing 70 may be configured with a space allowing movement of the filter housing 88 along the axis of the filtration element 72. The filter housing 88 may be housed within a filter housing shuttle 148 configured to move to three positions. A forward filter extraction position as shown in FIG. 15, a rearward filter storage position as shown in FIG. 16, and a push push latch actuation position, along a path defined by the control housing 70. The housing shuttle 148 may be biased forward by one or more springs mounted between a rear wall of the filter housing shuttle 148 and a rear wall of the control housing 70. When a user depresses the filter cartridge 72 from the forward filter extraction position to the push push latch actuation position, a push push latch, is engaged, and as the user releases the filter cartridge 72, the spring biases the shuttle forward to the rearward filter storage position. As the user depresses the filter cartridge 72 from the rearward filter storage position to the push push latch actuation position, the push push latch is disengaged, and as the user releases the filter cartridge 72, the spring biases the filter cartridge to the forward filter extraction position, allowing improved access to the user for the rotational movement and torque needed to disengage the filter cartridge 72 from the filter housing 88. The push push latch mechanism may include other mechanical or automated latching and engagement systems that allow the filtration cartridge 72 to extend and retract relative to the housing surface for installation and removal. FIG. 13 is an isometric view of the filter cover 91. The filter cover is configured to attach to the control housing by fasteners through mounting holes 132 in the filter cover 91. The filter housing 88 may be constrained rotationally about the axis of the filter cartridge 72 by filter housing constraints 136. Additionally, the filter cover 91 may include a plurality of water drainage slots 130, which line up at one end with the slot from the filter housing, as discussed in the above referenced U.S. patent application Ser. No. 13/233,390. Further drainage may be achieved through additional drainage slots 134 configured and a further rearward area. As illustrated, the water drainage slot 130 is configured to follow the cylindrical shape of the filter cover 91 such that the location of the slot at the front of the filter cover 91 facing the user is higher than the location of the slot corresponding with the filter housing 88, thereby preventing excess water from following a path toward the front of the filter cover 91 and dripping at the front of the ice maker 10. The water drainage slot 130 may be configured to include apertures to allow a path for water to drain into the ice storage area 50 and ultimately out of the ice maker 10. The water drainage slot 130 may include a fluid deflector 144 disposed between the apertures in the water drainage slot 130 and configured to direct any extraneous water flowing toward the front of the ice making appliance 10 down into the ice storage area 50.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements.

Moreover, the foregoing illustrations are illustrative, and no single feature or element is essential to all possible combinations that may be claimed in this or a later application. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An ice making appliance comprising:
    a water inlet;
    a water inlet valve disposed within the water inlet configured to allow water passage when in an open position and configured to prevent water passage when in a closed position;
    a reservoir in fluid communication with the water inlet;
    a water level sensor disposed in the reservoir; and
    a control unit in electrical communication with the water level sensor and the water inlet valve, the control unit including a computer readable storage medium;
    wherein the control unit is configured to calculate a fluid flow rate using the time between the water inlet valve opening and the water level sensor communicating when a first predetermined water level has been reached within the reservoir, and use the calculated flow rate to calculate a total water inlet valve open time to fill the reservoir to a second predetermined water level; and
    wherein:
        one or more times between the water inlet valve opening and the water level sensor communicating when a first predetermined water level has been reached within the reservoir are recorded on the computer readable storage medium as one or more recorded times, the control unit being configured to close the water inlet valve at a time based on the one or more of the recorded times if no signal is received from the water level sensor; or
        one or more calculated flow rates are recorded on the computer readable storage medium as one or more recorded flow rates, the control unit being configured to close the water inlet valve at a time based on the one or more of the recorded flow rates if no signal is received from the water level sensor.

2. The ice making appliance of claim 1, wherein the first predetermined water level within the reservoir is substantially the same as the second predetermined water level.

3. The ice making appliance of claim 1 wherein the control unit closes the water inlet valve once the total water inlet valve open time has elapsed.

4. The ice making appliance of claim 1 wherein the water level sensor is a contact sensor.

5. The ice making appliance of claim 1 wherein the water level sensor is connected to a reservoir bracket configured adjacent the reservoir.

6. The ice making appliance of claim 5 wherein the reservoir bracket is connected to the reservoir by a plurality of locking elements.

7. The ice making appliance of claim 6 wherein the reservoir bracket comprises a connector panel configured to receive one or more of a recirculation pump harness connector, a drain pump harness connector, and a contact sensor connector.

8. The ice making appliance of claim 7 comprising a cover slidably engaged with the reservoir bracket.

9. The ice making appliance of claim 8 wherein the cover comprises a plurality of slideable engagement elements configured to engage a cover mounting flange on the reservoir bracket.

10. The ice making appliance of claim 9, wherein the cover comprises a locking element configured to engage a corresponding notch on the reservoir bracket cover mounting flange.

11. A method of filling a reservoir within an ice making appliance, the method comprising:
   opening a water inlet valve;
   filling a reservoir to a first predetermined level;
   sending a signal from a water level sensor disposed within the reservoir to a control unit;
   calculating a water flow rate from the time between the time the water inlet valve is opened and the time the signal is sent from the water level sensor to the control unit;
   calculating the total time the water inlet valve remains open based on the calculated flow rate and a second predetermined water level;
   closing the water inlet valve once the total time the water valve remains open has elapsed;
   recording one or more of the times between the time the water inlet valve is opened and the time the signal is sent from the water level sensor to the control unit on a computer readable storage within the control unit as one or more recorded times; and
   closing the water inlet valve at a time based on the one or more of the recorded times if no signal is received from the water level sensor.

12. A method according to claim 11, further comprising the step of recording one or more calculated flow rates on a computer readable storage within the control unit as one or more recorded flow rates.

13. A method according to claim 12, further comprising the step of closing the water inlet valve at a time based on the one or more of the recorded flow rates if no signal is received from the water level sensor.

14. A method of filling a reservoir within an ice making appliance, the method comprising:
   opening a water inlet valve;
   filling a reservoir to a first predetermined level;
   sending a signal from a water level sensor disposed within the reservoir to a control unit;
   calculating a water flow rate from the time between the time the water inlet valve is opened and the time the signal is sent from the water level sensor to the control unit;
   calculating the total time the water inlet valve remains open based on the calculated flow rate and a second predetermined water level;
   closing the water inlet valve once the total time the water valve remains open has elapsed;
   recording one or more of calculated flow rates on a computer readable storage within the control unit as one or more recorded flow rates; and
   closing the water inlet valve at a time based on the one or more of the recorded flow rates if no signal is received from the water level sensor.

* * * * *